United States Patent
Drecq et al.

(10) Patent No.: US 6,427,656 B1
(45) Date of Patent: Aug. 6, 2002

(54) INTERNAL COMBUSTION ENGINE INCLUDING A MEANS OF REDUCING CYCLIC DISTURBANCES FOR LOW-SPEED RUNNING

(76) Inventors: Daniel Drecq, 8, rue Octave Allaire, 78610 Saint Leger en Yvelines; Guy Louradour, 118, rue Molière, 93100 Montreuil, both of (FR)

( * ) Notice: Subject to any disclaimer, the term of this patent is extended or adjusted under 35 U.S.C. 154(b) by 0 days.

(21) Appl. No.: 09/425,741

(22) Filed: Oct. 22, 1999

Related U.S. Application Data

(63) Continuation-in-part of application No. PCT/FR99/01638, filed on Jul. 7, 1999.

(30) Foreign Application Priority Data

Jul. 9, 1998 (FR) .............................................. 98 08826
May 26, 1999 (FR) .............................................. 99 06625

(51) Int. Cl.$^7$ ................................................ F16F 15/10
(52) U.S. Cl. ..................................... 123/192.1; 74/574
(58) Field of Search ......................... 123/192.1; 74/574, 74/572

(56) References Cited

U.S. PATENT DOCUMENTS

| | | | |
|---|---|---|---|
| 2,103,643 A | | 12/1937 | Salomon |
| 2,181,610 A | | 11/1939 | Salomon |
| 2,205,401 A | * | 6/1940 | Fischer .......................... 74/604 |
| 2,306,959 A | | 12/1942 | Knibbe |
| 2,317,983 A | | 5/1943 | Fischer |
| 2,361,710 A | | 10/1944 | Salomon |
| 5,295,411 A | | 3/1994 | Speckhart |
| 5,520,271 A | * | 5/1996 | Kohno et al. .............. 192/30 V |
| 5,533,422 A | * | 7/1996 | Speckhart ................. 74/573 R |
| 6,109,134 A | * | 8/2000 | Sudau .......................... 74/574 |
| 6,280,330 B1 | * | 8/2001 | Eckel et al. .................... 464/3 |

FOREIGN PATENT DOCUMENTS

| | | |
|---|---|---|
| FR | 748909 | 7/1933 |
| GB | 536589 | 5/1941 |
| GB | 598811 | 2/1948 |

* cited by examiner

*Primary Examiner*—Marguerite McMahon
*Assistant Examiner*—Hyder Ali
(74) *Attorney, Agent, or Firm*—Connolly Bove Lodge & Hutz, LLP; Larry J. Hume

(57) ABSTRACT

The invention relates to an internal combustion engine, the crankshaft (1) of which is equipped with a pulley or flywheel (4) secured to it by fastening means, in which said flywheel (4) is equipped with at least one pendular element (45), whose size, mass and position on said flywheel (4) are determined so as to be tuned to close to the angular frequency of the major harmonic of the cyclic disturbance.

36 Claims, 10 Drawing Sheets

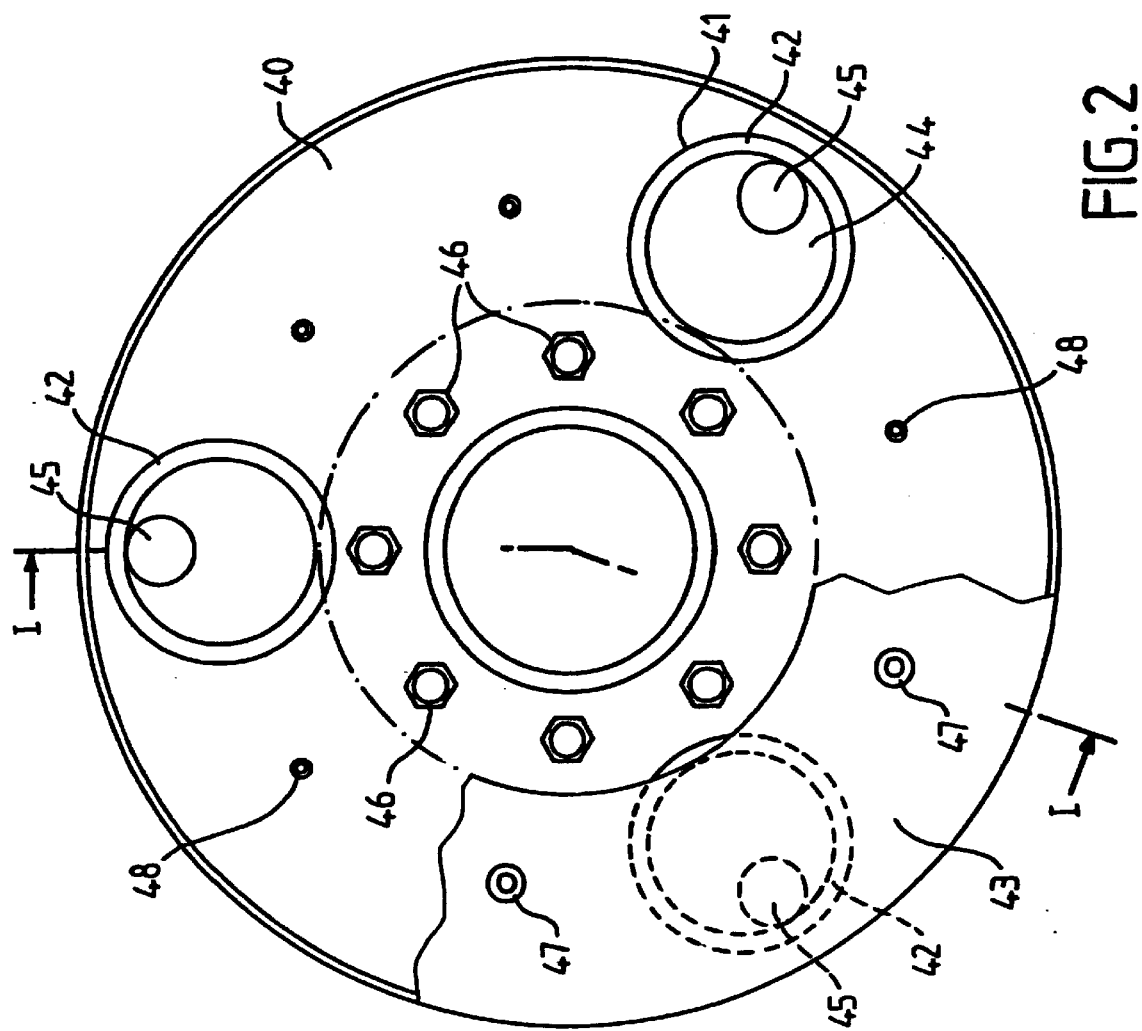
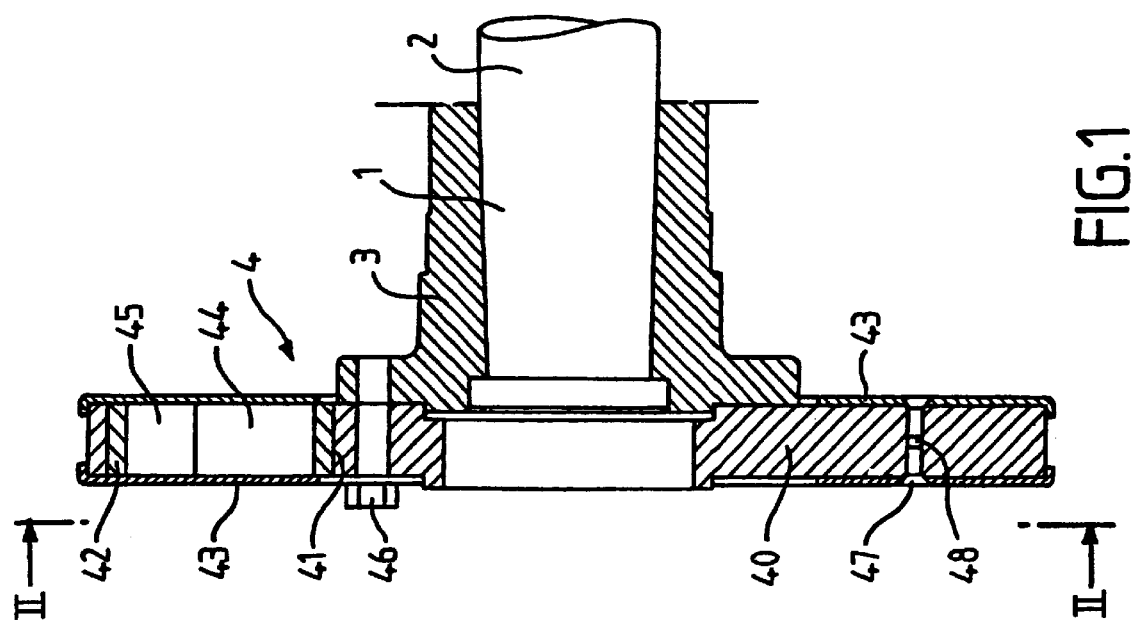
FIG. 2
FIG. 1

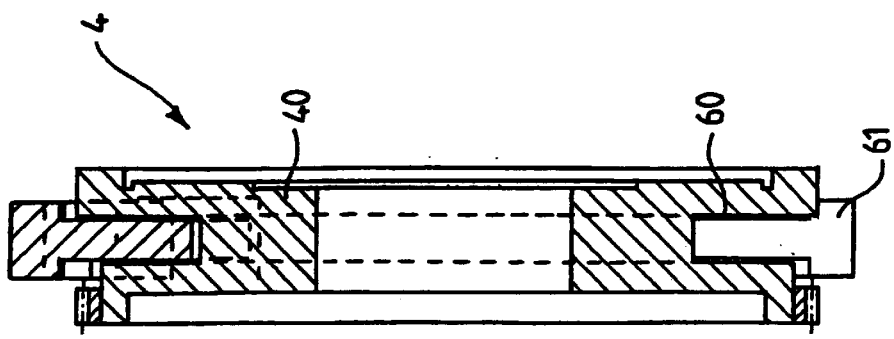
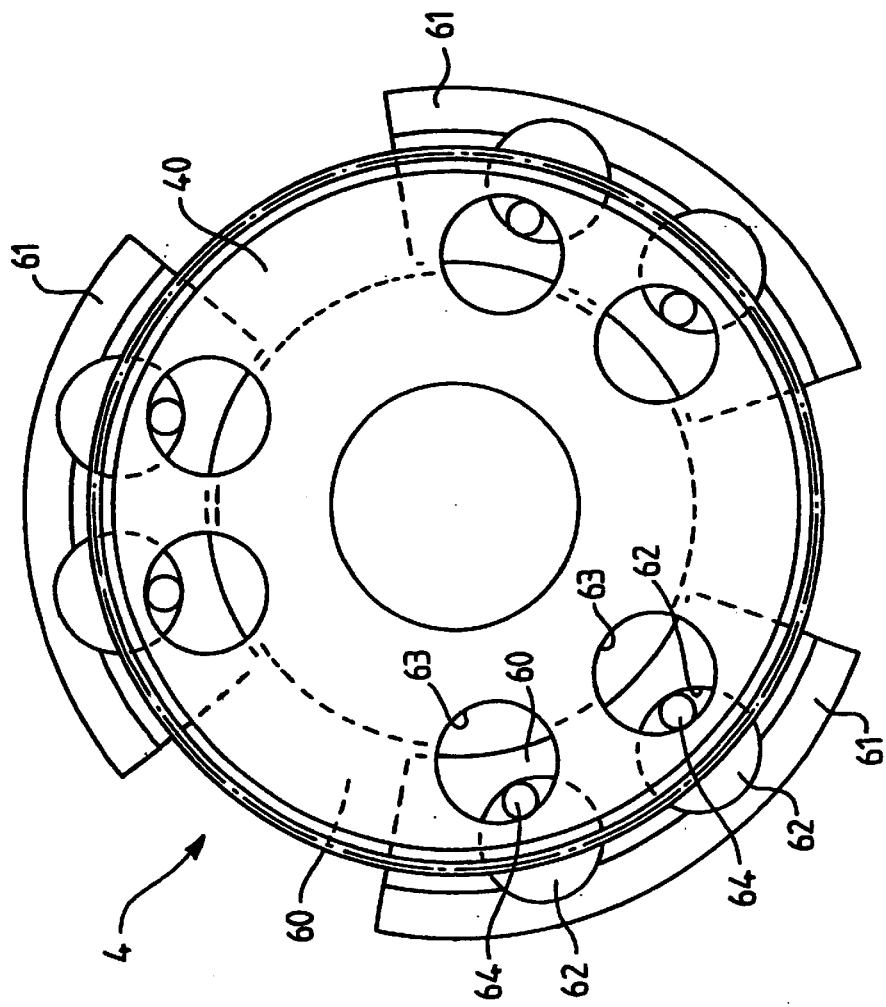

INTERNAL COMBUSTION ENGINE INCLUDING A MEANS OF REDUCING CYCLIC DISTURBANCES FOR LOW-SPEED RUNNING

CROSS REFERENCE TO RELATED APPLICATION

This application is a continuation-in-part of International Application No. PCT/FR/99/01638 filed Jul. 7, 1999.

BACKGROUND OF THE INVENTION

The present invention relates to a reciprocating internal combustion engine including a means of reducing cyclic disturbances for low-speed running.

At the current time, all engine manufacturers are looking to reduce the pollution and consumption of vehicle engines in town.

A first solution consists in stopping the engine at red lights and then re-starting it. This entails coupling a motor-alternator directly to the crankshaft, and this is expensive.

The second solution consists in reducing the rotational speed of the engines at low idle. However, when the low idle speed of an engine is reduced, the cyclic disturbances increase, and this makes its running unstable. The only way to reduce the cyclic disturbances is to increase the moment of inertia of the flywheel. However, this presents numerous drawbacks, namely: it involves a penalizing increase in the mass of the propulsion unit; it necessarily entails improving the performance of the starter motor; and it entails a drop in engine performance, the engine becoming slower to pick up speed.

The arrangement according to the present invention makes it possible to simultaneously obtain two antagonist results, namely: a flywheel with a high moment of inertia for dealing with cyclic disturbances, very greatly reducing these, and a lower moment of inertia for the engine because use is made of a flywheel of lower mass.

In order to achieve this result, use is made of pendular masses associated either with the flywheel or with a pulley on the other end of the crankshaft.

It is known practice for pendular masses to be associated with a crankshaft and one and/or other of its ends in order to damp out the vibrations which arise in the crankshaft itself when subjected to heavy load, which vibrations could cause the crankshaft to break.

SUMMARY OF THE INVENTION

In the case of the present invention, these pendular systems are being used not to protect the crankshaft against a risk of breakage due to vibration, but to combat the effects due to the moment of inertia of the engine assembly (crankshaft and pistons) when the engine is running at low speed (that is to say when the crankshaft is subjected to very light load) and is therefore subject to cyclic disturbances.

Such pendular systems are described in U.S. Pat. No. 5,295,411.

Surprisingly, it has been discovered that these same means could advantageously be employed to solve an entirely different problem, namely that of irregularities in the cycle, or "cyclic disturbances" which occur when an engine is running at low speed, the crankshaft then being subject to light load.

When wishing to tackle the problem of vibrations at heavy load, as is the case with the means described in U.S. Pat. No. 5,295,411, there is the desire to tune the pendulum (or pendulums) to the harmonics likely to excite the natural torsional mode of the crankshaft throughout the engine speed range. For a four-cylinder four-stroke engine, this angular frequency is of the order of 30,000 to 40,000 rpm.

By contrast, in the case of the present invention, the pendulum will be tuned to the number of explosions per revolution and this will be done for speeds close to the low idle speed (700 rpm and below), and thus for light load running. In the case of a four-cylinder four-stroke engine, there are two explosions per revolution which means that the pendulums will be tuned to the harmonic 2. The pendulums will therefore be tuned to the harmonic of the cyclic disturbance or, at the very least, to near to the angular frequency of its major harmonic.

This application of these pendular systems, which are known in themselves, to the very specific problem of cyclic disturbances makes it possible to have a moment of inertia adapted to suit rotational speeds of the order of 500 rpm±200.

These systems, the characteristics of which are calculated to be effective against cyclic disturbances at low speed, are inoperative and without effect at high speed.

According to the invention, at least one element capable, as the flywheel rotates, of having a pendular movement with respect to said flywheel when rotation occurs with cyclic disturbance is coupled to the crankshaft, for example to the flywheel. If $\Omega$ is the mean rotational speed of the engine, then it is known that during running, the instantaneous speed varies between $\Omega_1$ and $\Omega_2$; the cyclic irregularity coefficient is $$n = \frac{|\Omega_1 - \Omega_2|}{\Omega};$$

it may be calculated that, for a reciprocating internal combustion engine, $$n \approx \frac{k}{I\Omega^2}$$

where k is a constant which represents the amplitude of the variation in engine torque and I is the moment of inertia of the engine-receptor assembly. This shows that cyclic disturbances are at their highest when the mean rotational speed is at its lowest. The use of (a) pendular element(s), suitably tuned, makes it possible to compensate for the cyclic disturbances. The size and mass of the pendular elements, and their positions on the flywheel are advantageously chosen so that they are tuned to the major harmonics of the cyclic disturbances. It is found that, in this way, it is possible to run, for example, a 4-cylinder, 4-stroke engine at average speeds of close to 300 rpm without troublesome irregularities and using a flywheel which is lighter by comparison with those used in the state of the art.

The subject of the present invention is therefore an internal combustion engine, the crankshaft of which is equipped, for example, with a flywheel, characterized in that said flywheel is equipped with at least one pendular element whose size, mass and position on said flywheel are determined so as to be tuned to close to the angular frequency of the major harmonic or harmonics of the cyclic disturbance. For example, for an in-line 4-cylinder 4-stroke reciprocating engine, the major harmonic of the cyclic disturbance has an angular frequency equal to twice the rotational speed.

The present invention may also include the following arrangements taken separately or in combination:

a) the flywheel is equipped with at least two housings in which a flyweight can move freely;
b) the flywheel is equipped with three housings arranged 120° apart;
c) the flywheel is equipped with two groups of three housings arranged 120° apart, the two groups being interspersed symmetrically and each group having different sizes and positions, and different masses;
d) the side walls of each housing are planar and separated from one another by a runway track, the flyweight being a roller capable of rolling between the side walls along the runway track; as a preference, the roller is a cylinder of revolution;
e) the runway track of the housing, against which the roller rolls, is a surface of revolution about an axis perpendicular to the side walls of the housing;
f) the housing may be a cylinder of revolution;
g) the cross section of the runway track on a plane parallel to the side walls of the housing is a curve determined by calculation according to the desired reaction on the cyclic disturbance phenomena;
h) the side walls of each housing consist of annular cheeks fixed one on each side of the flywheel; the runway track of a housing consists of a ring inserted in an opening made in the flywheel, the interior edge of each annular cheek coming to rest against one end of each ring and constituting a runway track, the means of attaching the flywheel to the crankshaft being arranged in the central region left free by the annular cheeks;
i) the flywheel is equipped with three pendular devices arranged 120° apart, each pendular device being double;
j) the flywheel is equipped with two groups of three double pendular devices interspersed symmetrically and having different dimension, position and mass characteristics;
k) the double pendular system consists of a moving mass connected to the flywheel by two axles, each moving both in a housing formed in the mobile mass and in a housing formed in the flywheel;
l) the mobile mass has a T-shaped cross section;
m) the mobile mass has a U-shaped cross section;
n) the monofilar pendular system consists of an asymmetric flyweight borne in pivoting by an axle;
o) the monofilar pendular system consists of a cylindrical flyweight equipped with drillings on just one side, it being possible for these drillings to be separate or combined into a single slot;
p) the monofilar pendular system consists of a sealed casing filled with two immiscible liquids of different densities, for example oil and mercury;
q) the monofilar pendular system consists of a toothed pinion meshing either with a central pinion or with peripheral teeth;
r) the either monofilar or bifilar pendular system is locked in position above a predetermined rotational speed by radial sliders each held by a spring moving under the effect of centrifugal force;
s) the pendular system consists of n flyweights arranged n/360° [sic] apart, these flyweights having the shape of a circular sector subtending an angle of n/360° [sic] and mounted so that they can pivot on the flywheel;
t) each flyweight in the shape of a circular sector has a bore inside which a mobile mass moves.

BRIEF DESCRIPTION OF THE DRAWINGS

To make the invention easier to understand, one embodiment thereof, depicted in the appended drawing, will be described hereinbelow by way of purely illustrative and nonlimiting example.

In this drawing:

FIG. 1 depicts a view in axial section on I—I of FIG. 2, of the end of the crankshaft of an engine according to the invention equipped with a flywheel with pendular elements;

FIG. 2 depicts a view in elevation, with partial cutaway, of the flywheel of FIG. 1, on II—II of FIG. 1;

FIGS. 7 and 8 depict two views in elevation and in axial section of a third embodiment of the present invention;

DETAILED DESCRIPTION OF THE INVENTION

Figure 4:
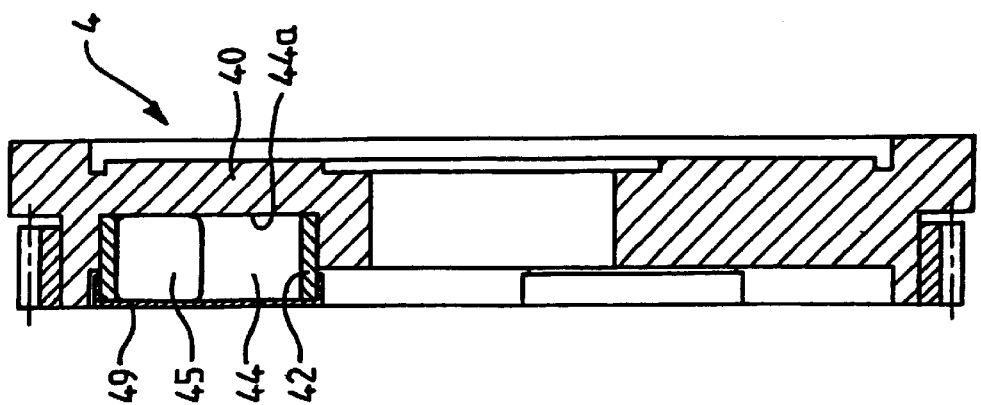
FIGS. 3 and 4 depict a view in elevation and a view in axial section of an alternative form of FIGS. 1 and 2.

Referring to FIGS. 1 and 2, it can be seen that fitted onto the end 1 of a crankshaft 2 is a sleeve 3 to which a flywheel, denoted by the general reference 4 is coaxially fastened. This fastening is achieved using eight studs 46 distributed uniformly about the axis of the flywheel 4.

The flywheel 4 consists of a solid disk 40 which is thick enough to have a significant moment of inertia suited to the engine with which it is associated. This disk 40 is pierced with three circular openings 41 120° apart, in each of which is inserted a cylindrical ring 42. The two faces of the disk 40 are covered with annular cheeks 43 which are fastened to the disk 40 by screws 47 cooperating with threaded bores 48 in the disk 40. These two cheeks 43 cover the ends of the rings 42 and, together with the interior volume of each cylindrical ring 42, define a closed cylindrical housing 44.

Arranged in each housing 44 is a flyweight consisting of a roller 45. This roller 45 is a solid cylinder, the length of which is approximately equal to (and in fact slightly shorter than) the thickness of the disk 40; this distance is the distance separating the two cheeks 43 and therefore defines the length of the housing 44. What this means is that the rollers 45 can move freely in their housings 44 and, in particular, can roll along the interior wall of said housings 44.

When the engine is stopped, each of the rollers 45 rests at the bottom of its housing 44; as soon as the engine reaches a few revolutions per minute, for example at the speed at which it is driven by the starter motor, the rollers 45, under the effect of centrifugal force, move to occupy the radial position depicted in FIGS. 1 and 2.

When the engine is running at low idle, cyclic disturbances occur and are manifested in successive decelerations and accelerations of the rotational speed of the crankshaft 1: the rollers 45 then roll along the wall of their cylindrical housings in one direction or the other, thus counterbalancing, or at the very least reducing said cyclic disturbances, said rollers then behaving like pendular elements.

In the example depicted, the housings 44 are cylindrical, which means that each roller 45 can be considered as being a pendulum; however, the invention is not restricted to this particular case.

Specifically, the interior wall of each housing may be of any cross section: circular (as depicted), elliptical, or other; it may even not be symmetric with respect to the radius of the disk 40 passing through the center of the cross section: this makes it possible to alter the law governing the reaction of the flyweights on the cyclic disturbance phenomena at will.

Likewise, in the example depicted, there are three housings 44 and three rollers 45, but the invention is not restricted to this particular embodiment: there has to be at least one housing and one flyweight, but there could be 2, 3, 4 or even more of these provided that they are arranged at uniform spacings with respect to the center of rotation of the flywheel.

Figure 3:
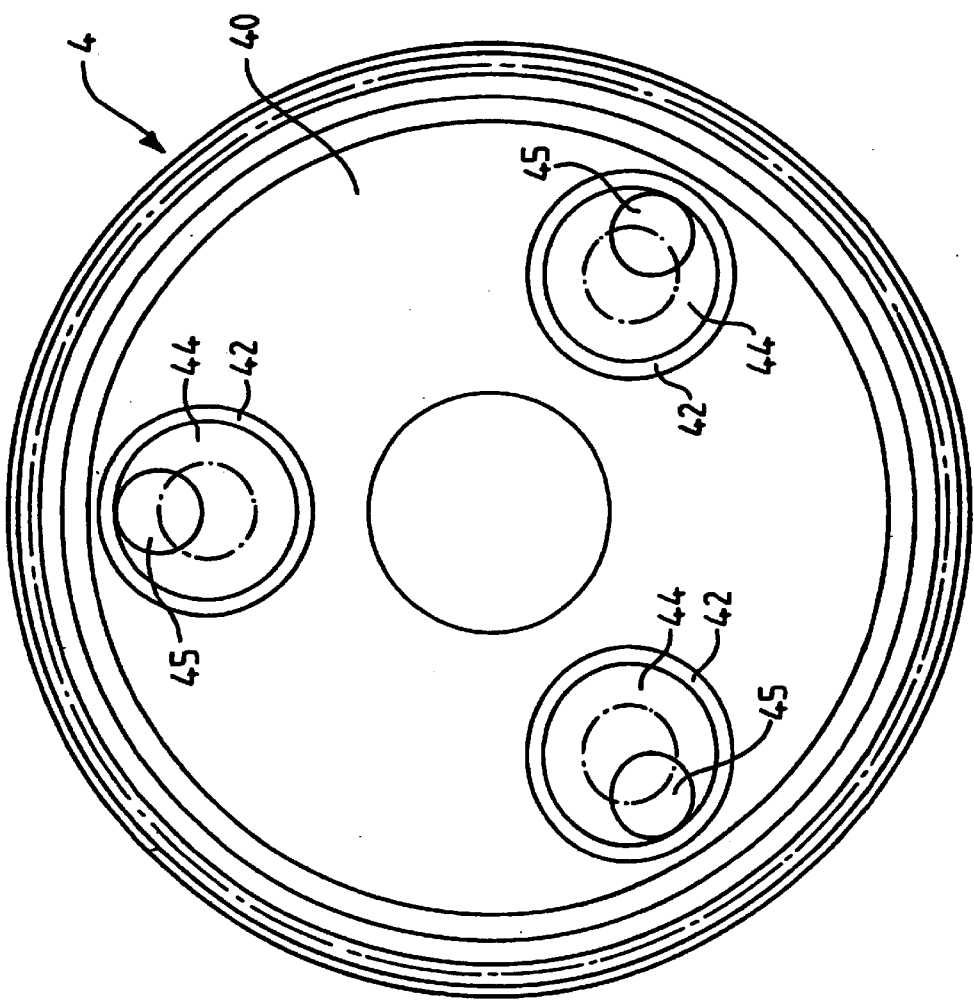

FIGS. 3 and 4 depict an alternative form of the embodiment of FIGS. 1 and 2, the same elements bearing the same references. To simplify the figures, only the flywheel 4 has been depicted, the crankshaft 1 and the means of fastening the flywheel 4 to the end of the crankshaft having been omitted because they do not form part of the invention. The same approach will be taken in the other FIGS. 5 to 10.

According to this alternative form, the housing 44 of each roller 45 does not pass through the entire thickness of the flywheel 40 but is hollowed from the latter over just a part of this thickness. Each housing 44 is equipped with a runway ring 42 which projects partially from the housing 44 and is covered by a cover 49. The roller 45 travels in the cylindrical volume consisting of the bottom 44a of the housing 44, the ring 42 and the cover 49.

The way in which this device works is the same as the way described for the previous FIGS. 1 and 2.

Figure 6:
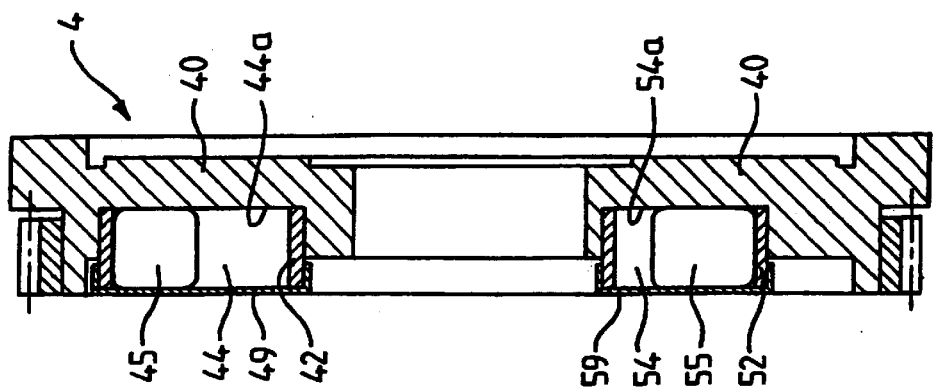
FIGS. 5 and 6 depict two views in elevation and in axial section of a second embodiment of the present invention.
Figure 5:
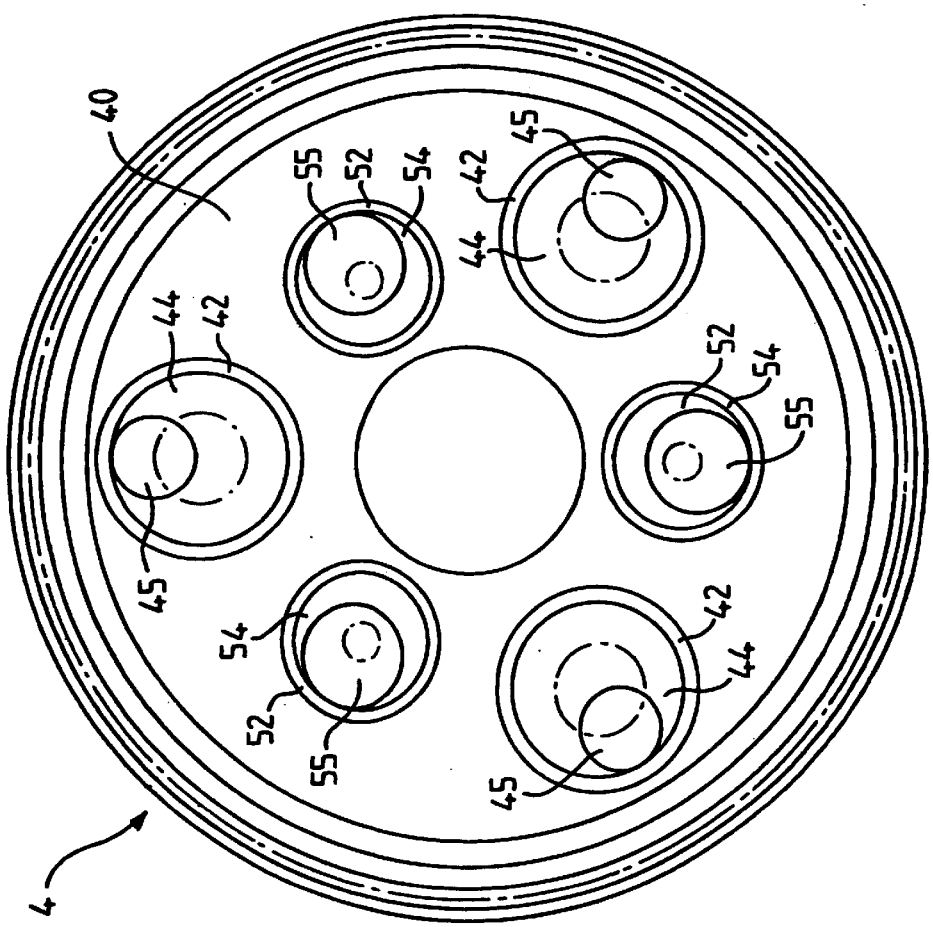

FIGS. 5 and 6 depict a second embodiment of the device according to the invention, the elements which are identical to those of FIGS. 1 to 4 bearing the same references.

This second embodiment is characterized in that the flywheel 4 has two groups of three housings which are uniformly interspersed.

There is, first of all, a group of three housings 44, arranged 120° apart, each housing containing a flyweight 45.

There is also a second group of three housings 54, arranged 120° apart. This second group is interspersed with the first, that is to say that the housings 44 and 54 are 60° apart. Each housing 54 is equipped with a runway ring 52, a flyweight 55 and is closed by a cover 59. It should be noted that all the dimensional parameters of the housings 54 differ from those of the housings 44, namely: their distance from the center of the flywheel 40 is shorter, their diameter is smaller and the mass of the flyweight 55 is different.

All these parameters can easily be determined by calculation so that the pendular elements 45 and the pendular elements 55 are tuned to close to the angular frequencies of the major harmonics of the cyclic disturbance.

FIGS. 7 to 10 illustrate a third embodiment of the invention.

Mathematical calculations show that it is preferable in certain cases to have double pendular systems, these being the systems known to specialists by the name of "bifilar" systems.

In FIGS. 7 to 10, there are three groups of pendular devices arranged 120° apart.

In FIGS. 7 and 8 it can be seen that the flywheel 4 has a peripheral groove 60. The portions 61a of three T-shaped masses 61 arranged 120° apart sit in this groove 60. Each portion 61a of a mass 61 is equipped with two circular drillings 62. The flywheel 40 is pierced with three pairs of circular drillings 63 arranged 120° apart. Each pair of drillings 63 corresponds to two drillings 62 in a mass 61. Axles 64 pass through the drillings 62 and 63. The axles 64 have a diameter smaller than that of the drillings 62 and 63. Each mass 61 therefore constitutes the equivalent of a pendulum suspended from two wires. When the rotational speed of the engine drops and then increases, each mass 61 swings in one direction and then in the other. The various parameters of these double pendulums: dimensions, position and mass, are determined by mathematical calculation so that they are tuned to an angular frequency close to the angular frequency of the chosen harmonic, in this case the major harmonic of the cyclic disturbance of the engine under consideration.

Figure 10:
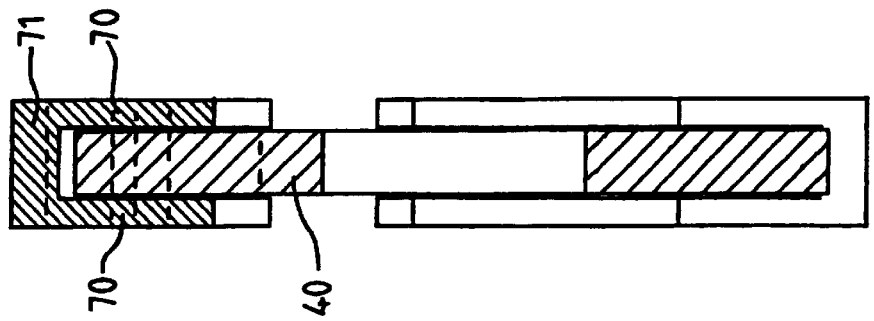
FIGS. 9 and 10 depict two views in elevation and in axial section of an alternative form of the third embodiment of the present invention.
Figure 9:
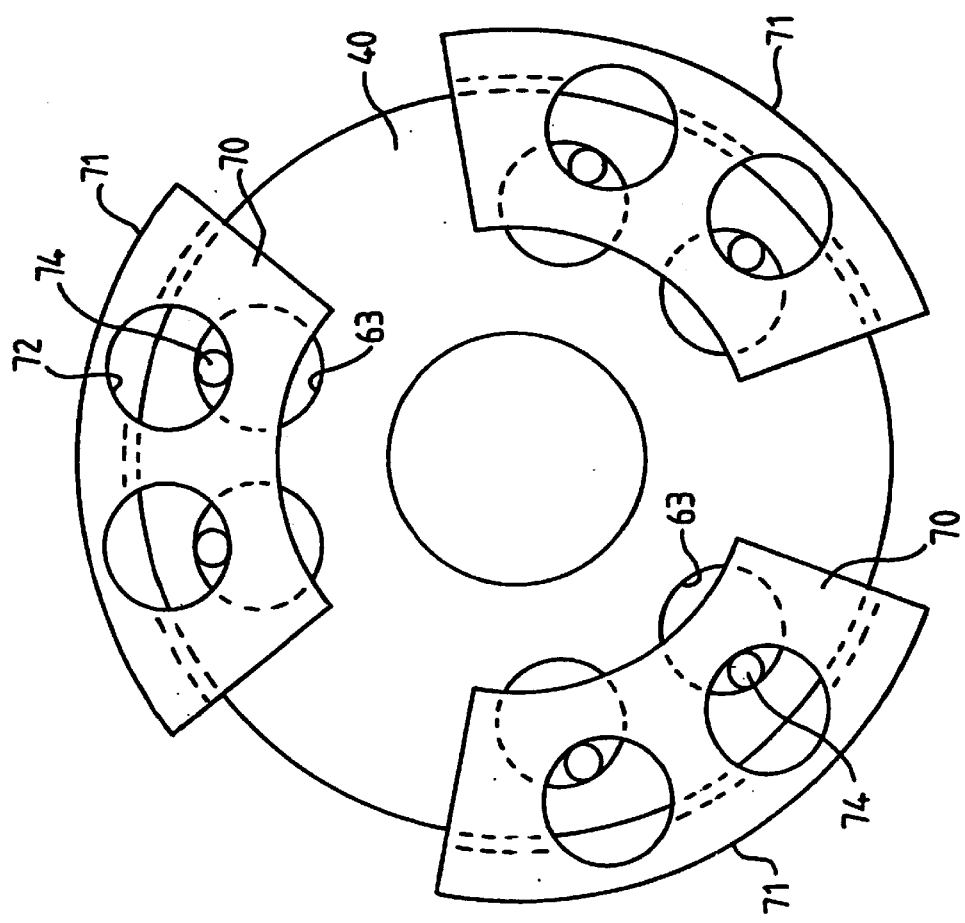

FIGS. 9 and 10 illustrate an alternative form of the device of FIGS. 7 and 8, the shape of each ass being inverted and U-shaped so as to form a caliper, identical elements bearing the same references.

Each mass 71 is a component, the cross section of which is U-shaped so that it sits over the flywheel 40. For this purpose, each mass 71 is equipped with two side walls 70, the spacing of which is slightly greater than the thickness of the flywheel 40.

The side walls 70 are equipped with drillings 72 which correspond to the drillings 62 in FIGS. 7 and 8; the flywheel 40 is equipped with the same drillings 63 as it was in FIGS. 7 and 8 and axles 74 (corresponding to the axles 64) pass through the drillings 63 and 72.

The operation is identical to that of the device depicted in FIGS. 7 and 8.

Note that FIGS. 5 and 6 depict a system having two groups of three flyweights 45 and 55 but the invention is not restricted to this particular arrangement: it is possible to have a number "n" of groups of flyweights, arranged on "q" different radii, the flyweights of each group having different masses "m". It does, however, prove necessary for the number "n" to be at least equal to 2 and for the flyweights to be offset by angles equal 360/n to for balancing reasons.

Similarly, there could be any number "n" of masses such as 61 or 71, of different masses "m", placed on "q" different radii, "n" being greater than or equal to 2 and the masses 61 or 71 being offset by angles equal to 360/n for balancing reasons.

FIGS. 11 to 18 depict various alternative forms which have been designed to prevent the flyweights or rollers from slipping.

Figure 11:
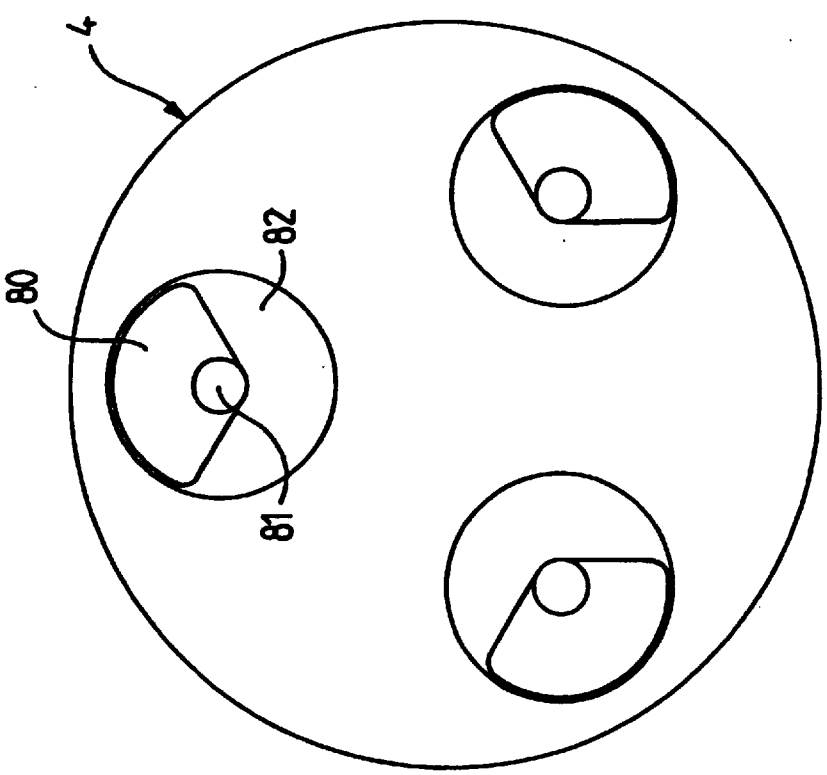
FIG. 11 depicts a view in elevation of a second alternative form of the flywheel of FIGS. 1 and 2.

In FIG. 11, it can be seen that the rollers 45 moving freely in cylindrical housings 44 have been replaced by asymmetric flyweights constituting the pendular mass 80 which are mounted on an axle 81 arranged at the center O of the housing 44 so that they can pivot in a housing 82.

Figure 12:
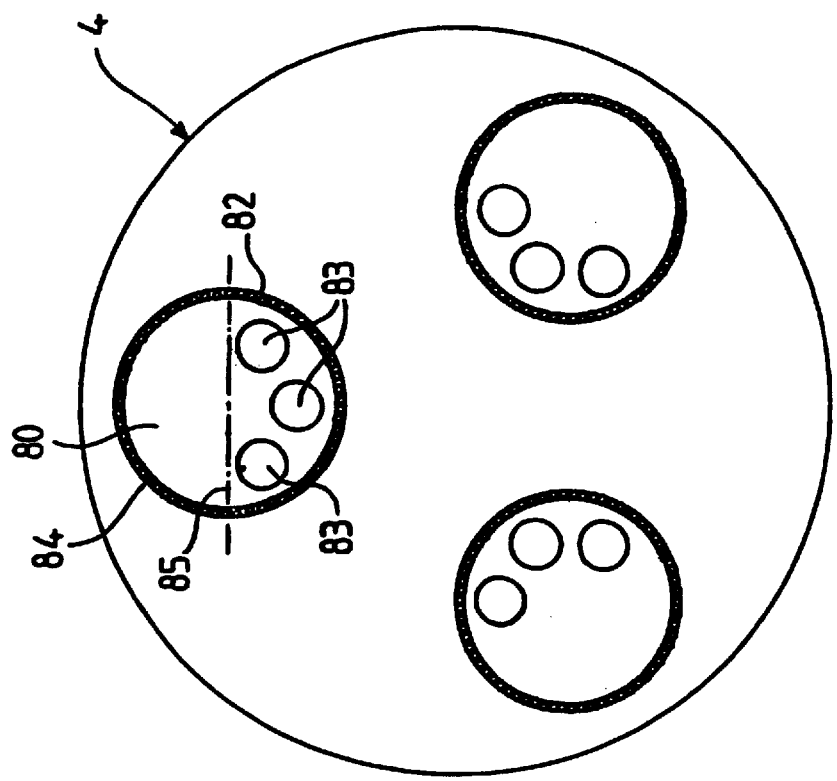
FIG. 12 depicts a view in elevation of a third alternative form of the flywheel of FIGS. 1 and 2.

In FIG. 12, it can be seen that the flyweight 80 consists of a cylinder which can turn freely inside the housing 82 by virtue of a ball bearing 83. Drillings 83 all made on the same side of the diameter 85 have the effect of introducing asymmetry into the mass of the flyweight 80, thus constituting the pendular mass.

Figure 13:
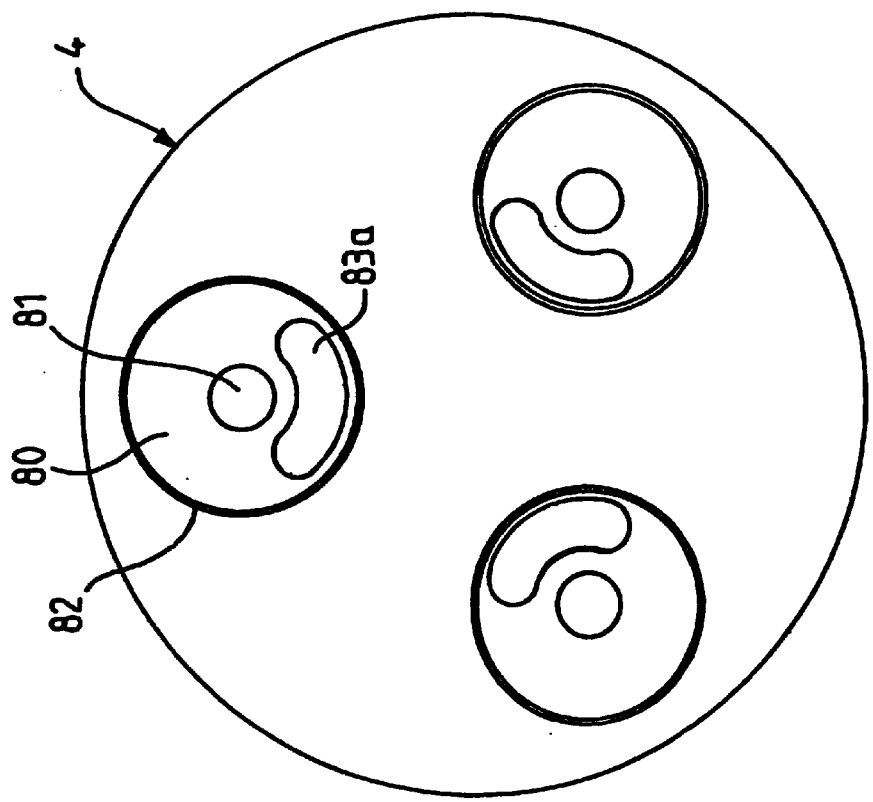
FIG. 13 depicts a view in elevation of a fourth alternative form of the flywheel of FIGS. 1 and 2.

In FIG. 13, it can be seen that the three drillings 83 of FIG. 12 have been combined into a single semicircular slot 83a.

Figure 14:
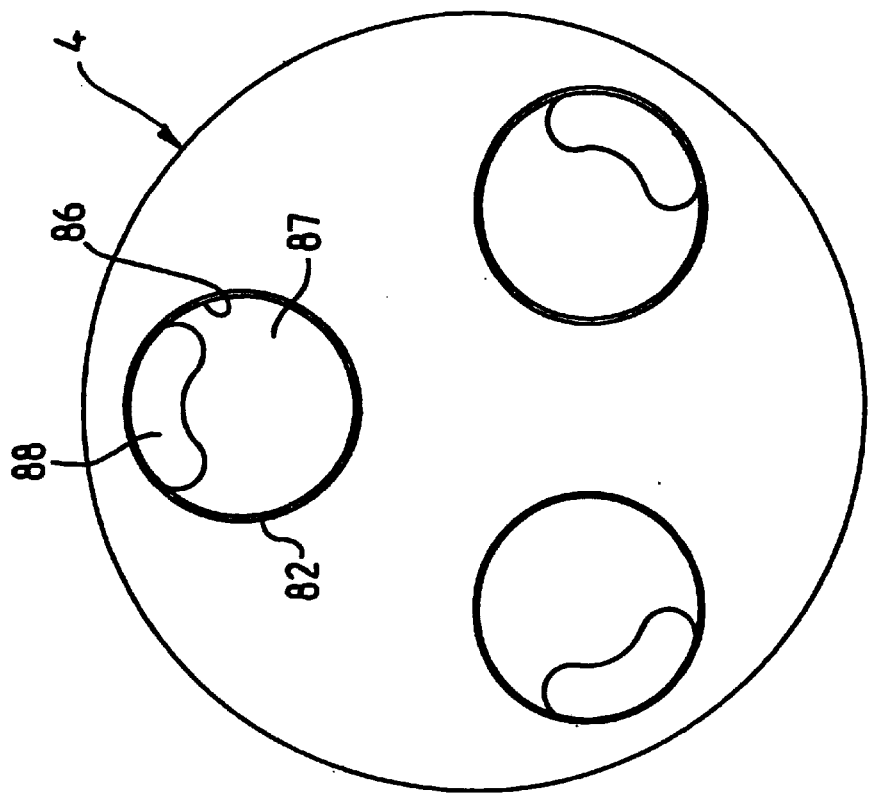
FIG. 14 depicts a view in elevation of a fifth alternative form of the flywheel of FIGS. 1 and 2.

In FIG. 14, it can be seen that arranged in the cylindrical housing 82 of center O is a sealed cylindrical casing 86, also of center O, this sealed casing 86 being filled with two immiscible liquids of different densities, for example with oil 87 and mercury 88. Under the effect of centrifugal force, the mercury forms a lenticular shape 88 as depicted and constitutes the pendular mass.

Figure 15:
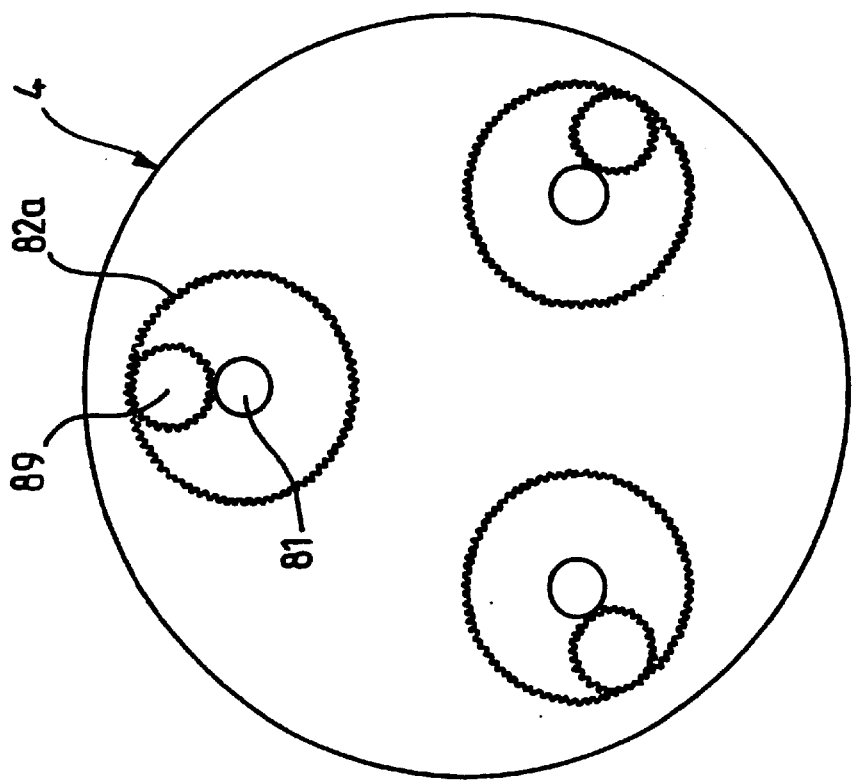
FIG. 15 depicts a view in elevation of a sixth alternative form of FIGS. 1 and 2.

In FIG. 15, it can be seen that the housing 82 is provided on its inside with teeth, with which a pinion 89 which constitutes the pendular mass, meshes.

In order to avoid the noises caused by the pinions 89 coming into contact with the teeth 82a, an axle 81 is preferably provided and stops the pinion 89 from having any play.

Figure 16:
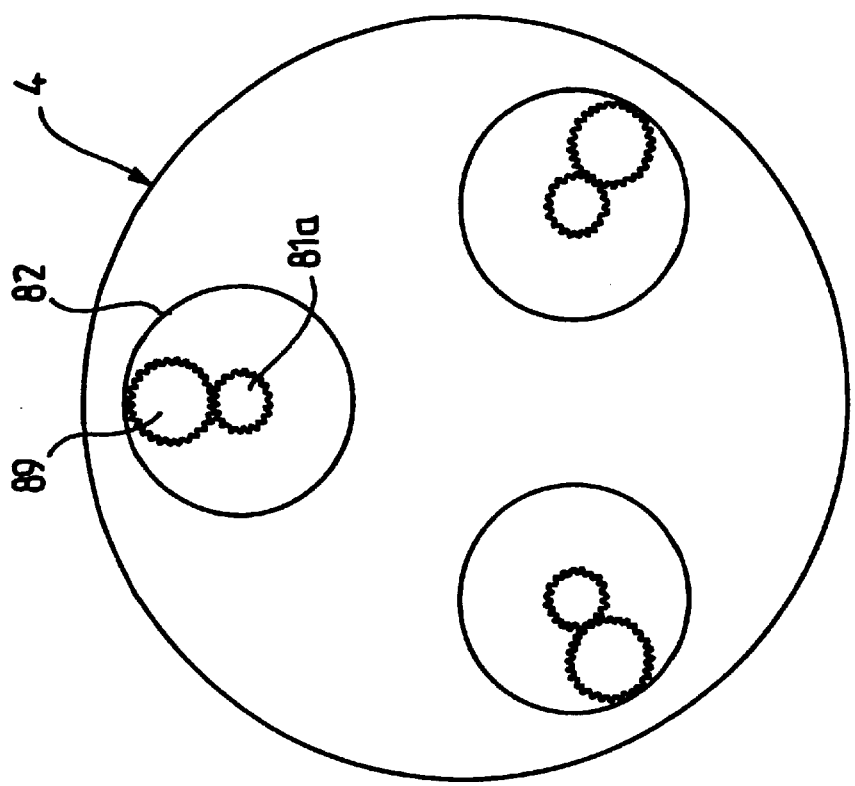
FIG. 16 depicts a view in elevation of a seventh alternative form of FIGS. 1 and 2.

FIG. 16 depicts an arrangement that is the reverse of that of FIG. 15. In this case, the pinion 89, acting as a pendular mass, meshes with the centered axle 81a which has teeth. The toothed axle 81a may be stationary or mounted so that it can pivot about its axis O.

The devices described in FIGS. 11 to 16 operate exactly like the devices described in FIGS. 1 and 2 or 3 and 4.

Figure 18:
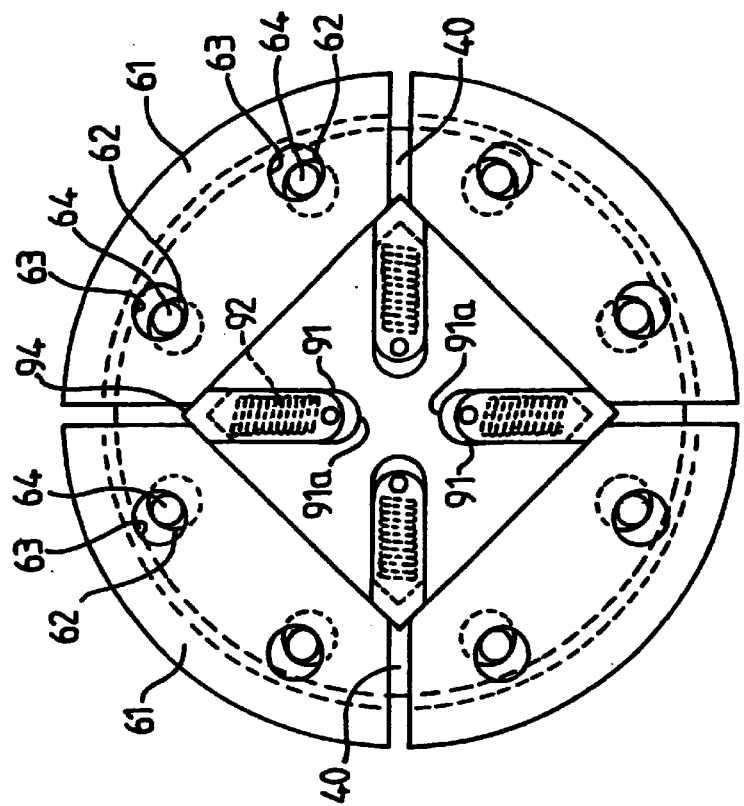
FIG. 18 depicts a view in elevation of an alternative form of the systems described in FIGS. 7 and 9, incorporating locking means similar to those of FIG. 17.
Figure 17:
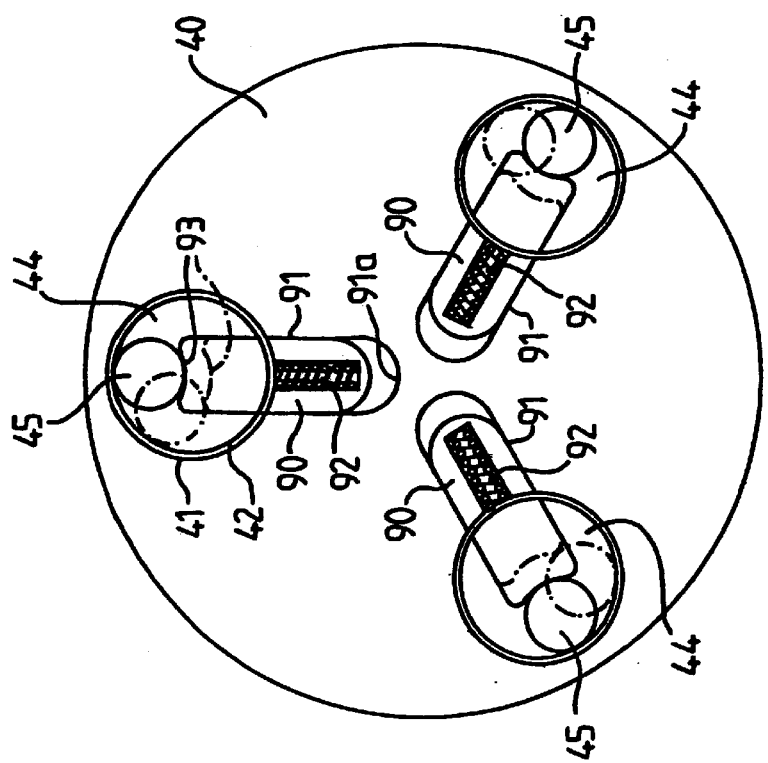
FIG. 17 depicts a view in elevation of an eighth alternative form of FIGS. 1 and 2.

FIGS. 17 an 18 depict arrangements which make it possible to cancel the effect of the pendular masses above a certain speed, whether this be using a monofilar pendulum (FIG. 17) or a bifilar pendulum (FIG. 18).

FIG. 17 corresponds to FIG. 2 and the same elements bear the same references. Arranged in the circular openings 41 made in the flywheel 40 are cylindrical rings 42 in each of which a roller 45 can move. A slider 90 can move in a housing 91, the axis of which is radial. A tension spring 92 keeps the slider 90 in contact with the closed end 91a of the housing 91. When the rotational speed of the flywheel 40 increases, the slider 90 moves radially against the action of the spring 92. At its opposite end to the closed end 91a of the housing 91, the slider 90 has a curved surface 93 intended to act as a seat for the roller 45. Quite obviously, the ring 42 has an appropriate opening to allow the slider 90 to pass. When stationary, the parts occupy the positions depicted in dashed line: that is to say the slider 90 rests against the closed end 91a of its housing 91 and the roller 45 can move freely. As the speed increases, the roller comes to adopt the position depicted in solid line and therefore acts like the pendulum it is supposed to according to the present invention. Above a certain rotational speed, defined as a function of the mass of the slider 90 and of the strength of the spring 92, the slider 93 [sic] locks the roller 45 in place and the roller therefore becomes inoperative.

FIG. 18 depicts a locking system which fulfills the same role as the one in FIG. 17, but for a bifilar pendular system like the one of FIGS. 7 and 8. In this FIG. 18, the elements which are the same as those in FIGS. 7 and 8 bear the same references and are not described again. Unlike in FIG. 7, the device comprises four bifilar pendular masses 61 arranged 90° apart (instead of three at 120°).

The flywheel 40 has four radial housings 91, 90° apart, the axes of these housings 91 coinciding with the axes of symmetry of said flywheel 40 separating the four bifilar pendular masses 61.

As was the case in FIG. 17, sliding in each housing 91 against the action of a tension spring 92 is a slider 90, but the end 94 of the slider is in the shape of a 90° wedge instead of being a semi-cylindrical seat 93.

The way in which this device works is similar to the way in which the device of FIG. 17 works.

When stationary, each slider 90 rests against the closed end 91a of its housing 91 under the effect of its tension spring 92. It is only above a speed that is determined as a function of the mass of each slider 90 and of the strength of its spring 92 that the sliders 90 will slide under the effect of centrifugal force to lock the masses 61 in place, so that the masses then become inoperative.

Figure 20:
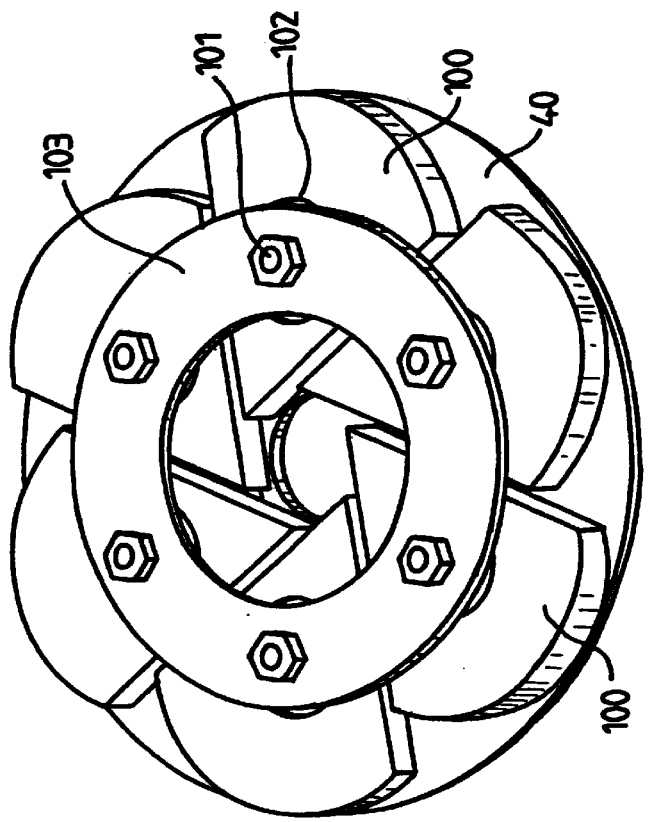
FIG. 20 is a perspective view of FIG. 19.
Figure 19:
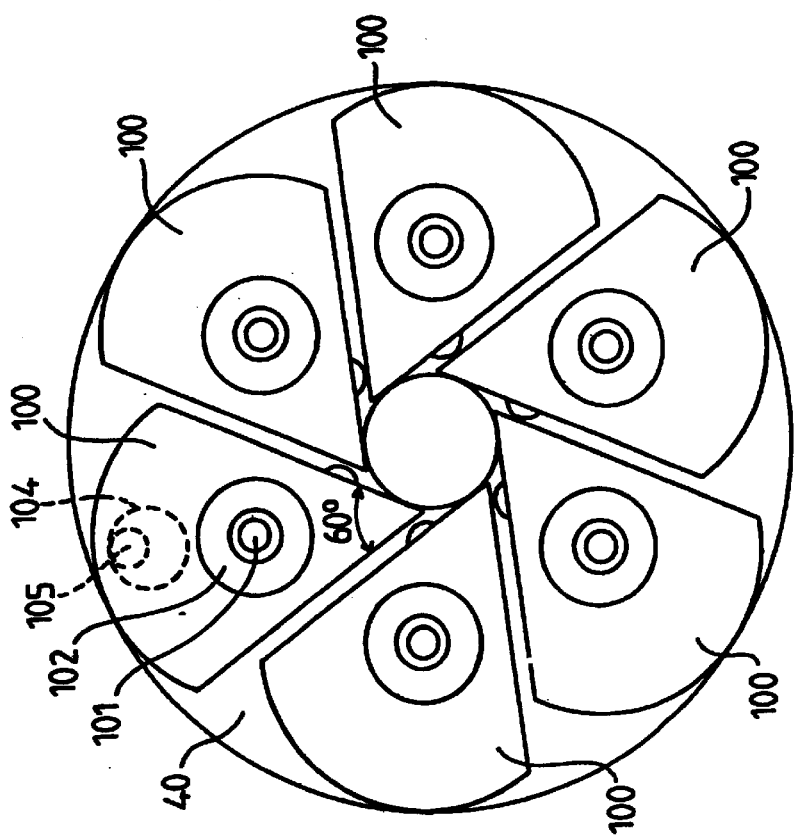
FIG. 19 depicts a plan view of a fourth embodiment of the present invention, with an alternative form depicted in dotted lines.

FIGS. 19 and 20 depict a fourth embodiment of the invention.

With reference to these figures, it can be seen that the pendular masses consist of six flyweights 100, each flyweight 100 being mounted so that it can pivot on the flywheel 40 by means of an axle 101 and a bearing or rolling bearing 102. The axles 101 are arranged 60° apart and the flyweights 100 have the shape of a circular sector subtending an angle of 60°.

As illustrated in FIG. 20, the axles 101 are borne by a circular flange 103.

According to an alternative form, depicted in dotted line in FIG. 19, each flyweight may have a bore 104, centered on its bisector, arranged beyond the axle 101 with respect to the center of the flywheel 40, in which a mobile mass 105 can move in a similar way to what is depicted in FIGS. 1 to 6.

Quite obviously, the invention is not restricted to the case in which there are six flyweights, it being possible for there to be any number "n" of flyweights, but preferably more than 3 of these.

What is claimed is:

1. A flywheel for reducing cyclic disturbances of a rotating crankshaft, comprising:
    at least one pendular element having a size, mass and position on said flywheel determined so as to be tuned close to an angular frequency of a major harmonic of the cyclic disturbance;
    at least three housings arranged 120° apart;
    an asymmetric flyweight arranged in each housing,
    said asymmetric flyweight constituting said pendular element, mounted so that said pendular element can pivot on at least one of an axle located on a center of said each housing, or on a bearing mounted in sad each housing.

2. The flywheel of claim 1, further comprising two groups of three housings arranged 120° apart,
    the two groups being interspersed symmetrically, wherein each group has different sizes, positions, and masses.

3. The flywheel of claim 1, wherein said flywheel is equipped with at least "n" housings in which a flyweight can move freely, "n" being greater than or equal to 2.

4. The flywheel of claim 1, wherein said flywheel is equipped with "n" groups of pendular devices arranged on "q" different radii, masses "m" of said pendular elements being different; "n" being greater than or equal to 2 and said masses being separated by angles equal to 360/n.

5. A flywheel for reducing cyclic disturbances of a rotating crankshaft, comprising:
   at least one pendular element having a size, mass and position on said flywheel determined so as to be tuned close to an angular frequency of a major harmonic of the cyclic disturbance;
   wherein said flywheel is equipped with at least "n" housing in which a flyweight can move freely, "n" being greater than or equal to 2,
   wherein side walls of each of said at least "n" housings are planar and separated from one another by a runway track,
   wherein said flyweight rolls between said side walls along the runway track,
   wherein said runway track of each of said at least "n" housings is a ring inserted in an opening made in said flywheel.

6. The flywheel of claim 5, wherein said roller is a cylinder of revolution.

7. The flywheel of claim 5, wherein said runway track of each housing, against which a roller rolls, is a surface of revolution about an axis perpendicular to said side walls of the housing.

8. The flywheel of claim 7, wherein said housing is a cylinder of revolution.

9. The flywheel of claim 5, wherein a cross section of said runway track on a plane parallel to the side walls of the housing is a curve determined by calculation according to a desired reaction to the cyclic disturbance.

10. The flywheel of claim 5, wherein said side walls of each housing comprise annular cheeks fixed one on each side of said flywheel.

11. A flywheel for reducing cyclic disturbances of a rotating crankshaft, comprising:
    at least one pendular element having a size, mass and position on said flywheel determined so as to be tuned close to an angular frequency of a major harmonic of the cyclic disturbance;
    at least three housings arranged 120° apart; and
    in each of said three housings, a cylindrical flyweight of asymmetric mass constituting said pendular element,
    wherein an asymmetry of said asymmetric mass is obtained by drillings drilled in just one side of the flyweight.

12. The flywheel of claim 11, wherein said drillings are combined into a single slot.

13. A flywheel for reducing cyclic disturbances of a rotating crankshaft, comprising:
    at least one pendular element having a size, mass and position on said flywheel determined so as to be tuned close to an angular frequency of a major harmonic of the cyclic disturbance;
    at least three housings arranged 120° apart; and
    a sealed casing in each of said three housings,
    each of said three housings being filled with two immiscible liquids of different densities, so as to constitute a pendular mass.

14. The flywheel of claim 13, wherein one of said two liquids is oil and the other is mercury.

15. A flywheel for reducing cyclic disturbances of a rotating crankshaft, comprising:
    at least one pendular element having a size, mass and position on said flywheel determined so as to be tuned close to an angular frequency of a major harmonic of the cyclic disturbance;
    at least three housings arranged 120° apart,
    wherein each of said tree housings has internal teeth with which a toothed pinion constituting said pendular element meshes.

16. The flywheel of claim 15, wherein each toothed pinion is arranged between the toothed housing and a central axle.

17. A flywheel for reducing cyclic disturbances of a rotating crankshaft comprising:
    at least one pendular element having a size, mass and position on said flywheel determined so as to be tuned close to an angular frequency of a major harmonic of the cyclic disturbance;
    at least three housings arranged 120° apart,
    wherein each housing has, at a center, a first tooted pinion with which a second toothed pinion constituting said pendular element meshes,
    wherein said first toothed pinion is either stationary or rotary.

18. A flywheel for reducing cyclic disturbances of a rotating crankshaft, comprising:
    at least one pendular element having a size, mass and position on said flywheel determined so as to be tuned close to an angular frequency of a major harmonic of the cyclic disturbance;
    at least "n" housings in which a flyweight can move freely, "n" being greater than or equal to 2,
    wherein side walls of each housing of said at least "n" housings are planar and separated from one another by a runway track,
    wherein said flyweight is a roller which rolls between said side walls along the runway track,
    wherein each roller is locked in place, above a predetermined rotational speed, by a slider sliding in a radial housing against an action of an associated return spring.

19. The flywheel of claim 18, wherein said predetermined rotational speed above which locking occurs is a function of a mass of each slider and of a strength of said associated return spring.

20. A method for reducing cyclic disturbances of a rotating crankshaft, comprising:
    providing a flywheel secured to said crankshaft;
    providing said flywheel with at least one pendular element having a size, mass and position on said flywheel determined so as to be tuned close to an angular frequency of a major harmonic of the cyclic disturbance;
    equipping said flywheel with at least "n" housings in which a flyweight can move freely, "n" being greater than or equal to 2,
    wherein said equipping includes equipping said flywheel with at least three housings arranged 120° apart; and
    arranging an asymmetric flyweight in each of said "n" housings, said asymmetric flyweight constituting said pendular element, mounted so as to pivot on at least one of an axle located on a center of said each "n" housings, or on a bearing mounted in said each "n" housings.

21. The method of claim 20, further comprising equipping said flywheel with "n" groups of pendular devices arranged on "q" different radii, wherein masses "m" of said pendular element are different, "n" is greater than or equal to 2, and said masses are separated by angles equal to 360/n.

22. A method for reducing cyclic disturbances of a rotating crankshaft, comprising:
   providing a flywheel secured to said crankshaft;
   providing said flywheel with at least one pendular element having a size, moss and position on said flywheel determined so as to be tuned close to an angular frequency of a major harmonic of the cyclic disturbance;
   equipping said flywheel with at least "n" housings in which a flyweight can move freely, "n" being greater than or equal to 2,
   wherein side walls of each of said at least "n" housing are planar and separated from one another by a runway track, and said flyweight is a roller which rolls between said side walls along the runway track,
   wherein said runway track is a ring inserted in an opening made in said flywheel.

23. The method of claim 22, wherein said roller is a cylinder of revolution.

24. The method of claim 22, wherein said runway track of each housing, against which a roller rolls, is a surface of revolution about an axis perpendicular to said side walls of the housing.

25. The method of claim 24, wherein said housing is a cylinder of revolution.

26. The method of claim 22, wherein a cross section of said runway track on a plane parallel to the side walls of the housing is a curve determined by calculation according to a desired reaction to the cyclic disturbance.

27. The method of claim 22, wherein said side walls of each housing comprise annular cheeks fixed one on each side of said flywheel.

28. A method for reducing cyclic disturbances of a rotating crankshaft, comprising:
   providing a flywheel secured to said crankshaft;
   providing said flywheel with at least one pendular element having a size, mass and position on said flywheel determined so as to be tuned close to an angular frequency of a major harmonic of the cyclic disturbance;
   equipping said flywheel with at least "n" housings in which a flyweight can move freely, "n" being greater than or equal to 2,
   wherein said equipping includes equipping said flywheel with at least three housings arranged 120° apart; and
   providing, in each of said "n" housings, a cylindrical flyweight of asymmetric mass constituting said pendular element,
   wherein an asymmetry of said asymmetric mass is obtained by drilling holes in just one side of the flyweight.

29. The method of claim 28, wherein said drilling includes combining the holes into a single slot.

30. A method for reducing cyclic disturbances of a rotating crankshaft, comprising:
   providing a flywheel secured to said crankshaft;
   providing said flywheel with at least one pendular element having a size, mass and position on said flywheel determined so as to be tuned close to an angular frequency of a major harmonic of the cyclic disturbance;
   equipping said flywheel with at least "n" housings in which a flyweight can move freely, "n" being greater than or equal to 2,
   wherein said equipping includes equipping said flywheel with at least three housings arranged 120° apart; and
   arranging, in each housing, a sealed casing filled with two immiscible liquids of different densities, so as to constitute a pendular mass.

31. The method of claim 30, wherein one of said two liquids is oil and the other is mercury.

32. A method for reducing cyclic disturbances of a rotating crankshaft, comprising:
   providing a flywheel secured to said crankshaft;
   providing said flywheel with at least one pendular element having a size, mass and position on said flywheel determined so as to be tuned close to an angular frequency of a major harmonic of the cyclic disturbance;
   equipping said flywheel with at least "n" housings in which a flyweight can move freely, "n" being greater than or equal to 2,
   wherein said equipping includes equipping said flywheel with at least three housings arranged 120° apart; and
   meshing, within each of said "n" housings, internal teeth of an associated toothed housing with a toothed pinion constituting said pendular element.

33. The method of claim 32, further comprising arranging each toothed pinion between the associated toothed housing and a central axle.

34. A method for reducing cyclic disturbances of a rotating crankshaft, comprising:
   providing a flywheel secured to said crankshaft;
   providing said flywheel with at least one pendular element having a size, mass and position on said flywheel determined so as to be tuned close to an angular frequency of a major harmonic of the cyclic disturbance;
   equipping said flywheel with at least "n" housings in which a flyweight can move freely, "n" being greater than or equal to 2,
   wherein said equipping includes equipping said flywheel with at least three housings arranged 120° apart; and
   providing each housing, at a center, a first toothed pinion with which a second toothed pinion constituting said pendular element meshes,
   wherein said first toothed pinion is either stationary or rotary.

35. A method for reducing cyclic disturbances of a rotating crankshaft, comprising:
   providing a flywheel secured to said crankshaft;
   providing said flywheel with at least one pendular element having a size, mass and position on said flywheel determined so as to be tuned close to an angular frequency of a major harmonic of the cyclic disturbance;
   equipping said flywheel with at least "n" housings in which a flyweight can move freely, "n" being greater than or equal to 2,
   wherein side walls of each of said at least "n" housing are planar and separated from one another by a runway track, and said flyweight is a roller which rolls between said side walls along the runway track; and
   locking each roller in place, above a predetermined rotational speed, by engaging a slider sliding in a radial housing against an action of an associated return spring.

36. The method of claim 35, wherein said predetermined rotational speed above which locking occurs is a function of a mass of each slider and of a strength of the associated return spring.

* * * * *